(12) United States Patent
Hiromoto

(10) Patent No.: US 10,047,754 B2
(45) Date of Patent: Aug. 14, 2018

(54) BRUSHLESS MOTOR AND FAN USING THE MOTOR

(71) Applicant: MINEBEA MITSUMI INC., Kitasaku-gun, Nagano (JP)

(72) Inventor: Akiharu Hiromoto, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 931 days.

(21) Appl. No.: 14/491,202

(22) Filed: Sep. 19, 2014

(65) Prior Publication Data
US 2015/0093271 A1    Apr. 2, 2015

(30) Foreign Application Priority Data

Sep. 30, 2013 (JP) .................................. 2013-205787
Sep. 17, 2014 (JP) .................................. 2014-189330

(51) Int. Cl.
*H02K 1/27* (2006.01)
*F04D 25/06* (2006.01)
(Continued)

(52) U.S. Cl.
CPC ........... *F04D 25/06* (2013.01); *F04D 19/002* (2013.01); *F04D 25/064* (2013.01); *H02K 1/27* (2013.01);
(Continued)

(58) Field of Classification Search
CPC ........ H02K 5/24; H02K 15/03; H02K 1/2786; H02K 1/2713; H02K 21/22; H02K 2213/03; F04D 25/064
(Continued)

(56) References Cited

U.S. PATENT DOCUMENTS 4,737,674 A * 4/1988 Miyao .................. H02K 1/2733
310/156.05
5,089,733 A * 2/1992 Fukuoka ................... H02P 6/16
310/156.05
(Continued)

FOREIGN PATENT DOCUMENTS

JP          H07-99749 A      4/1995
JP          A-09-140104      5/1997
(Continued)

OTHER PUBLICATIONS

D.Hanselman, "Brushless Permanent Magnet Motor Design", 2nd Edition, 2003, Chap.2 pp. 15-44.*
(Continued)

*Primary Examiner* — Burton Mullins
(74) *Attorney, Agent, or Firm* — Pearne & Gordon LLP

(57) ABSTRACT

A brushless motor 5 of the present invention comprises: a rotor magnet 13 having a magnetized circumferential surface 13a comprising an upper circumferential surface 13a1 magnetized with a plurality of magnetic poles and a lower circumferential surface 13a2 magnetized with a plurality of magnetic poles; and a stator 30 having a stator stack 31 at least partially facing the lower circumferential surface 13a2, wherein the upper circumferential surface 13a1 of the rotor magnet 13 has a surface magnetic flux density of substantially the same level from a center of a magnetic pole until a vicinity of an adjacent magnetic pole, and the lower circumferential surface 13a2 of the rotor magnet 13 has a surface magnetic flux density decreasing from a center of a magnetic pole toward an adjacent magnetic pole.

8 Claims, 5 Drawing Sheets

(51) Int. Cl.
    *F04D 19/00* (2006.01)
    *H02K 21/00* (2006.01)
    *H02K 21/22* (2006.01)
(52) U.S. Cl.
    CPC ............. *H02K 21/00* (2013.01); *H02K 21/22* (2013.01); *H02K 1/2786* (2013.01); *H02K 2213/03* (2013.01)
(58) Field of Classification Search
    USPC .............................................. 310/51, 156.43
    See application file for complete search history.

(56) References Cited

U.S. PATENT DOCUMENTS

| | | | | |
|---|---|---|---|---|
| 5,095,238 | A * | 3/1992 | Suzuki | H02K 1/2786 310/156.46 |
| 5,220,227 | A * | 6/1993 | Ohi | H02K 1/2786 310/114 |
| 6,580,190 | B2 * | 6/2003 | Takasu | G11B 19/2009 310/154.28 |
| 6,849,978 | B2 * | 2/2005 | Sun | F04D 29/058 310/90 |
| 7,049,776 | B2 * | 5/2006 | Hornberger | H02P 6/16 318/400.04 |
| 7,417,345 | B2 * | 8/2008 | Chen | F04D 29/051 310/156.04 |
| 8,134,267 | B2 * | 3/2012 | Kim | H02K 1/2786 310/156.26 |
| 8,508,882 | B1 * | 8/2013 | Tamaoka | H02K 21/22 360/99.08 |
| 2005/0035670 | A1 | 2/2005 | Cen et al. | |
| 2010/0080716 | A1 * | 4/2010 | Tsai | F04D 29/057 417/354 |
| 2013/0004114 | A1 | 1/2013 | Hasegawa et al. | |

FOREIGN PATENT DOCUMENTS

| | | |
|---|---|---|
| JP | A-2001-136706 | 5/2001 |
| JP | A-2003-111360 | 4/2003 |
| JP | A-2013-117300 | 6/2013 |

OTHER PUBLICATIONS

Sep. 27, 2016 Office Action issued in Japanese Patent Application No. 2014-189330.

* cited by examiner

BRUSHLESS MOTOR AND FAN USING THE MOTOR

TECHNICAL FIELD

The present invention is related to a brushless motor and a fan using the motor.

BACKGROUND ART

For example, in Japanese Laid-open Patent Application Publication No. 2001-136706, a motor is disclosed where the axial length of the rotor magnet is set to be longer than the axial length of the stator. In addition, it is disclosed that the magnetic center C2 of the rotor magnet is displaced in the axial direction from the magnetic center C1 of the stator and an attractive force in the axial direction between the magnetic centers C2 and C1 is generated. The attractive force is transmitted to the rotor shaft which is connected to the rotor magnet, and the rotor shaft can be pressed downward (to the thrust plate).

As illustrated in FIG. 8 of Japanese Laid-open Patent Application Publication No. 2013-117300, such a motor is also used in a fan. The fan is frequently used in the household appliances and the like for cooling, and so quietness is required. One of the noise sources of the fan is the motor unit. A motor with high cogging torque and torque ripple cannot rotate smoothly, and results in a generation of vibration and noise. In order to suppress the cogging torque and the torque ripple, it is disclosed to change gradually the surface magnetic flux density in the circumferential direction of the rotor magnet, for example, by making the magnetization waveform similar to a sinusoidal wave (see Japanese Laid-open Patent Application Publications No. 2003-111360 and No. H09-140104).

The present inventors studied the case where the magnetization waveform of the surface magnetic flux density in the circumferential direction of the rotor magnet is a sinusoidal waveform in a motor having the axial length of the rotor magnet longer than the axial length of the stator, and found that the position detection by the Hall sensor of the brushless motor rarely became unstable. However, when a groove was introduced on the outer periphery of the rotor shaft in order to facilitate the assembly of the thrust washer on the rotor shaft which prevent falling out of the rotor shaft and the thrust washer was fitted in the groove, it was observed that the position detection by the Hall sensor became unstable.

The width of the above groove should be wider than the thickness of the thrust washer because it is difficult to perform the assembly if the width of the groove is same to the thickness of the thrust washer. Consequently, the rotor shaft can move in the thrust direction (axial direction) by an amount corresponding to the difference between the width of the groove portion and the thickness of the thrust washer. Then, when the rotor shaft moves in the thrust direction (axial direction), the rotor magnet connected to the rotor shaft also moves in the thrust direction, and the distance between the rotor magnet and the Hall sensor varies. As a result, it becomes difficult for the Hall sensor to detect the magnetic field correctly, and the detection of the position based on the magnetic field becomes unstable.

In such a case, there is an option to use a Hall sensor of high sensitivity capable to detect the magnetic field even at a large distance. However, such a high-sensitivity Hall sensor is expensive, and it is not desirable in terms of cost.

Another option is to provide a stronger hold down force in the thrust direction, in order to suppress the movement of the rotor magnet in the thrust direction. To achieve this purpose, it is necessary to obtain a hold down force in the thrust direction by changing the magnetization waveform of the surface magnetic flux density of the rotor magnet. However, as understood from the disclosures of Japanese Laid-open Patent Application Publications No. 2003-111360 and No. H09-140104, taking into consideration the suppression of the cogging torque and the torque ripple, it is not easy to change the magnetization waveform corresponding to the surface magnetic flux density of the rotor magnet.

CITATION LIST

Patent Literature

Patent Literature 1: Japanese Laid-open Patent Application Publication No. 2001-136706
Patent Literature 2: Japanese Laid-open Patent Application Publication No. 2013-117300
Patent Literature 3: Japanese Laid-open Patent Application Publication No. 2003-111360
Patent Literature 4: Japanese Laid-open Patent Application Publication No. H09-140104

SUMMARY OF INVENTION

Technical Problem

The present invention has been accomplished under the circumstances described above. It is an object of the present invention to provide a brushless motor in which the hold down force in the thrust direction is improved and a fan using the motor, while maintaining an appropriate magnetization waveform for suppressing the cogging torque and the torque ripple.

Solution to Problem

In order to achieve the above object, the present invention can be understood by the following configurations.
(1) A brushless motor comprises: a rotor magnet having a magnetized circumferential surface, the magnetized circumferential surface comprising an upper circumferential surface magnetized with a plurality of magnetic poles and a lower circumferential surface magnetized with a plurality of magnetic poles; and a stator having a stator stack at least partially facing the lower circumferential surface, wherein the upper circumferential surface of the rotor magnet has a surface magnetic flux density of substantially the same level from a center of a magnetic pole until a vicinity of an adjacent magnetic pole, and wherein the lower circumferential surface of the rotor magnet has a surface magnetic flux density decreasing from the center of a magnetic pole toward an adjacent magnetic pole or a surface magnetic flux density of substantially the same level at a vicinity of the center of the magnetic pole and decreasing from the vicinity of the center of the magnetic pole toward the adjacent magnetic pole.
(2) In the above configuration (1), the rotor magnet may have a boundary between the magnetization waveform of the upper circumferential surface and the magnetization waveform of the lower circumferential surface located between a position lower than an upper end surface of the stator stack by $1/5$ of a thickness of the stator stack and a position upper than the upper end surface of the stator stack by ½ of a distance between the upper end surface of the stator stack and an upper end surface of the rotor magnet.

(3) In the above configurations (1) or (2), the upper circumferential surface of the rotor magnet may have a first magnetization waveform of a rectangular or trapezoidal shape representing the distribution of the surface magnetic flux density, and the lower circumferential surface of the rotor magnet may have a second magnetization waveform of a sinusoidal or a substantially sinusoidal shape representing the distribution of the surface magnetic flux density.

(4) In any one of the above configurations (1) to (3), the brushless motor may further comprise: a rotor hub; a rotor shaft being provided at a center of the rotor hub; and a bearing housing for accommodating a bearing for rotatably supporting the rotor shaft, wherein the rotor magnet having the magnetized circumferential surface on a cylindrical inner circumferential surface is provided on an inner circumferential surface of the rotor hub, and wherein the stator is provided on the outer periphery of the bearing housing.

(5) A fan comprises: the brushless motor according to the above configuration (4); and a blade disposed on an outer periphery of the rotor hub of the brushless motor.

Advantageous Effects of Invention

According to the present invention, a brushless motor which the hold down force in the thrust direction is improved and a fan using the motor can be provided while maintaining an appropriate magnetization waveform for suppressing the cogging torque and the torque ripple. Further, according to the present invention, due to the improved hold down force in the thrust direction, a brushless motor which detection operation of the Hall sensor is stable and a fan using the motor can be provided.

DESCRIPTION OF EMBODIMENTS

Hereinafter, the embodiments for carrying out the present invention shall be described with reference to the accompanying drawings. Throughout the description of the embodiments, the same reference number is given to the same element. A description of an embodiment of the present invention is hereinafter given based on a fan which is an example of the use of a brushless motor according to an embodiment of the present invention.

(Overall Configuration of Fan)

Figure 1:
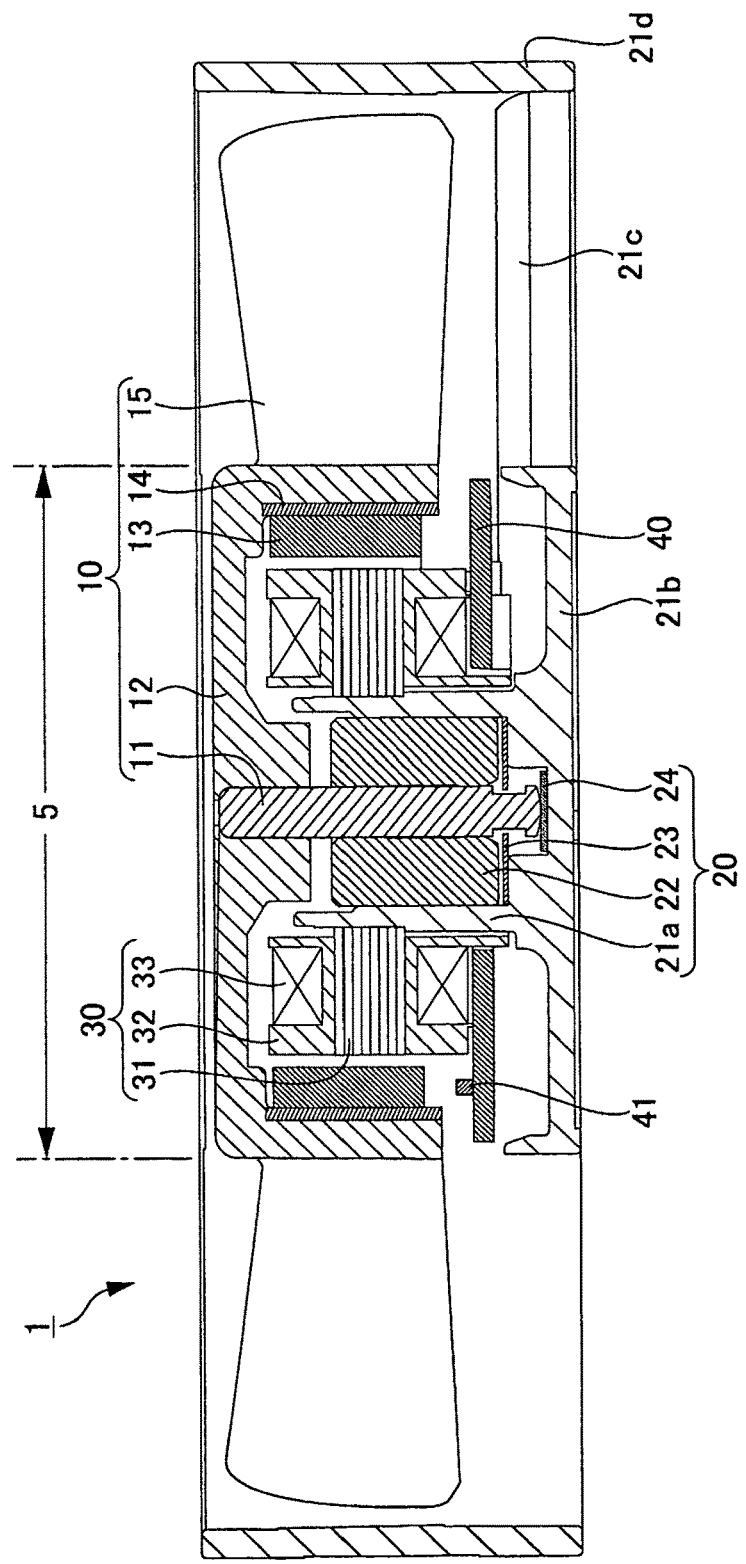
FIG. 1 is a longitudinal cross-sectional view illustrating an overall configuration of a fan according to an embodiment of the present invention.

An overall configuration of a fan 1 will be described with reference to FIG. 1. FIG. 1 is a longitudinal cross-sectional view of the fan 1. As illustrated in FIG. 1, the fan 1 of an embodiment of the present invention includes a brushless motor 5, a blade 15 which is fixed to the rotor hub 12 constituting the outer periphery of the brushless motor 5, and a casing 21d to accommodate the brushless motor 5 and the blade 15. In the following, a rotor portion of the brushless motor 5 and the blade 15 are assumed to be formed integrally as one-piece body corresponding to a rotor portion 10, and then a description is made by dividing the fan 1 to the rotor portion 10, a bearing portion 20, a stator 30 and a circuit board 40

(Rotor Portion)

The rotor portion 10 is constituted by the rotor hub 12 where the blade 15 is provided on the outer circumferential surface and a rotor yoke 14 is provided on the inner periphery, a rotor shaft 11 which is fixed to the center of the rotor hub 12 and a rotor magnet 13 which is mounted on the inside of the rotor yoke 14. In FIG. 1, there is shown a case where the rotor shaft 11 is directly fixed to the rotor hub 12, but it is possible to provide an opening at the center of the rotor hub 12 and to attach a component such as a rotor boss in the opening and then to attach the rotor shaft 11 to the rotor boss.

Further, the rotor yoke 14 can be fixed to the inner circumferential surface of the rotor hub 12 by integrating when molding the rotor hub 12, or can be fixed to the inner circumferential surface by means of press-fitting or adhesion after molding the rotor hub 12. Further, the rotor magnet 13 can be mounted to the inside of the rotor yoke 14 by means of press-fitting or adhesion. In the example of FIG. 1, the rotor magnet 13 is cylindrical, and a plurality of magnetic poles are magnetized so that an S pole and an N pole appear alternately in the circumferential direction of the inner circumferential surface of the cylinder.

Note that in this example, the blade 15 is provided on the outer circumferential surface of the rotor hub 12 because the fan 1 is illustrated as a specific example, but in the case of a motor the blade 15 is unnecessary. Further, in FIG. 1, the blade 15 is integrally formed with the rotor hub 12, but it is possible to make the blade 15 separately and then attach the blade 15 to the outer periphery of the rotor hub 12.

(Bearing Portion)

A bearing portion 20 includes a bearing housing 21a, a bearing 22, a thrust washer 23, and a thrust plate 24. The bearing housing 21a is formed integrally with a connecting portion 21c which connects the casing 21d to a base portion 21b. The thrust plate 24, the thrust washer 23 and the bearing 22 are disposed in the bearing housing 21a. In some fans, the connecting portion 21c is designed as a stationary blade, and so, in the embodiment of the present invention, the connecting portion 21c can be a stationary blade. The casing 21d is a portion which covers the outer periphery of the blade 15, and forms an air flow path in the fan 1.

FIG. 1 shows a case where the bearing housing 21a, the base portion 21b, the connecting portion 21c and the casing 21d are integrally formed. However, it is possible to form the bearing housing 21a separately, and then to mount the bearing housing 21a to a part composed of the base portion 21b, the connecting portion 21c and the casing 21d. The bearing 22 to be accommodated in the bearing housing 21a is a component for rotatably supporting the rotor shaft 11. In FIG. 1, a sliding bearing 22 is used, but a pair of ball bearings can be used instead of the sliding bearing 22. A thrust plate 24 is a member to receive a thrust force (axial force) of the rotor shaft 11, and is a component to maintain the positional accuracy of the rotor shaft 11 so that the rotor shaft 11 matches the central axis of rotation, as well as to reduce the rotational resistance of the rotor shaft 11.

The thrust washer 23 is a member for preventing falling out of the rotor shaft 11, and in the case of FIG. 1, falling out of the rotor shaft 11 to the upward direction of the figure is prevented. Specifically, the thrust washer 23 is a ring-shaped member, and is fitted to the rotor shaft 11 by inserting the rotor shaft 11 to the opening in the center of the ring. As illustrated in FIG. 1, on the circumferential surface of the lower end of the rotor shaft 11, there is a groove portion where the thrust washer 23 is located, and the opening in the center of the thrust washer 23 is set to be smaller than the outer diameter of the rotor shaft 11, and larger than the outer diameter of the groove portion.

The size of the central opening and the elastic modulus of the material of the thrust washer 23 are selected such that the thrust washer 23 can be pushed into the rotor shaft 11 and the rotor shaft 11 does not fall out when the rotor shaft 11 moves to the falling out direction. Further, in order to facilitate the assembly, a plurality of cut can be provided radially from the edge of the central opening of the thrust washer 23, so that the central opening can deform slightly during the assembly. As illustrated in FIG. 1, the assembled thrust washer 23 is sandwiched between the bearing 22 and a bottom surface portion of the bearing housing 21*a*, and so the movement in the thrust direction (axial direction) is restricted.

According to an example of a specific assembling procedure, the thrust plate 24 is disposed in a recess in the bottom surface portion of the bearing housing 21*a*, then the thrust washer 23 is disposed on the bottom surface portion, and then the bearing 22 is pressed into the bearing housing 21*a* and the rotor shaft 11 is inserted. Note that the assembling procedure is not limited to the above procedure. For example, a procedure in which the bearing 22 is press-fitted to the bearing housing 21*a* after inserting the rotor shaft 11 to the bearing 22 and fitting the thrust washer 23 to the groove portion 11*a* of the rotor shaft 11 can be adopted.

Note that in the present example, the fan 1 is illustrated as a specific example. Because a fan is commonly provided with the connecting portion 21*c* and the casing 21*d*, the connecting portion 21*c* and the casing 21*d* are also provided in the example. However, even in the case of a fan, in some cases the connecting portion 21*c* and the casing 21*d* is not required. Further, in the case of a motor, the connecting portion 21*c* and the casing 21*d* is not required.

(Stator)

A stator 30 has a structure where a winding (coil) 33 is provided through an insulator 32 to the salient poles of the stator stack (also referred to as a stator core) 31 which has a plurality of salient poles. Further, a plurality of lines are depicted in the stator stack 31 in FIG. 1. This indicates that the stator stack 31 has a structure in which a plurality of electromagnetic steel plates are laminated. By supplying a current to the winding 33, the salient poles of the stator stack 31 are excited and the salient pole becomes an N pole or an S pole. The excited magnetic pole and the magnetic pole magnetized on the inner circumferential surface of the rotor magnet 13 attract or repel each other, and then the rotor portion 10 rotates and the motor drive is realized.

Specific installation of the stator 30 may be made by press-fitting the stator stack 31 to the outer periphery of the bearing housing 21*a*. However, the assembly process is not limited to press-fitting, and it may be carried out by adhesion or the like. Further, FIG. 1 shows an example provided with a step portion for positioning the stator stack 31 in the bearing housing 21*a*, but this step portion may be omitted.

(Circuit Board)

A circuit board 40 is for mounting electronic components such as an integrated circuit (IC) and a Hall element (Hall sensor), and the end portion of the winding 33 is connected electrically to the electronic components using a solder or the like. The current supplied to the winding is controlled by the electronic components. FIG. 1 shows an example where the circuit board 40 is placed on the base portion 21*b*. However, the circuit board 40 may also be fixed to the lower end of the insulator 32 or to the outer periphery of the bearing housing 21*a*. The fixing method may be for example press-fitting, adhesion or the like.

Figure 2:
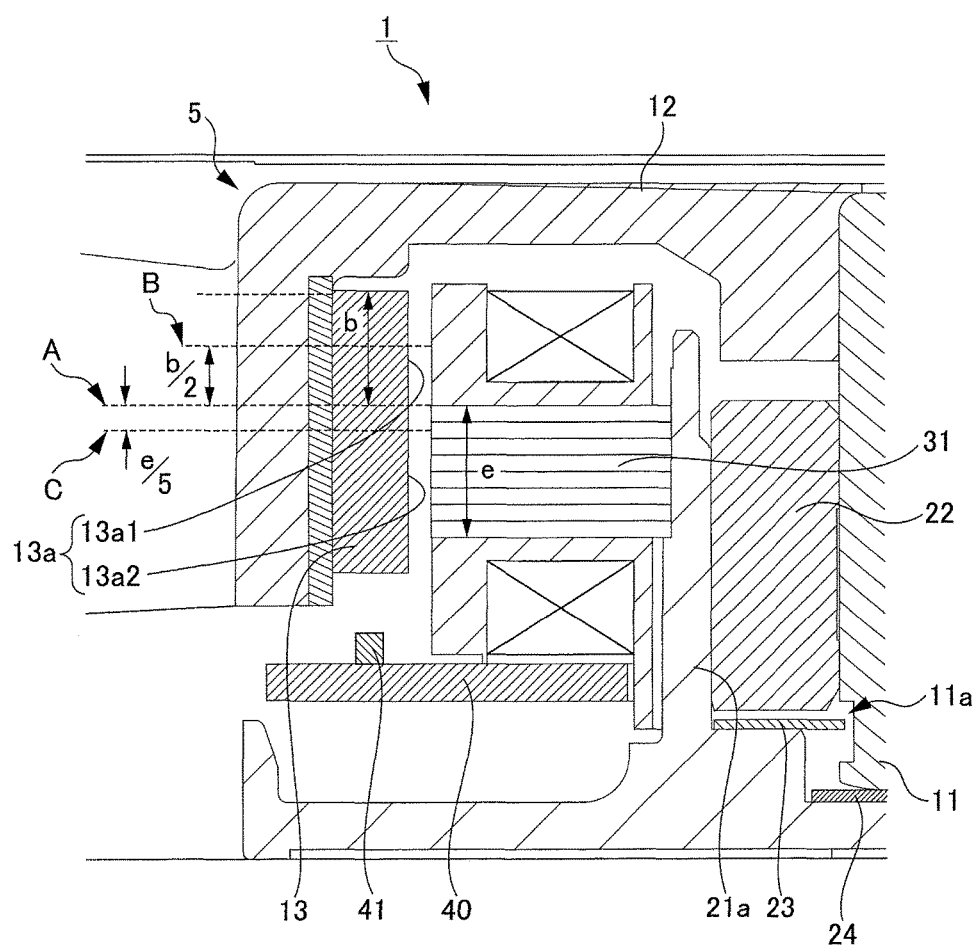
FIG. 2 is an enlarged view of the portion surrounding the stator and the rotor magnet at the left side in FIG. 1.

Next, referring to FIG. 2, further, the embodiment shall be described in detail. FIG. 2 is an enlarged view of the portion of the stator 30 and the rotor magnet 13 depicted on the left side of FIG. 1. Further, in FIG. 2, the symbols which represent the positions to be described hereunder are represented. In order to avoid illegibility of the representation of these symbols, some of reference numbers are omitted, but unless noted especially, the reference numbers are the same as in FIG. 1.

As illustrated in FIG. 2, the groove portion 11*a* is formed in the lower part of the rotor shaft 11, and the thrust washer 23 is fitted in the groove portion 11*a*. The width of the groove portion 11*a* is larger than the thickness of the thrust washer 23. Therefore, the rotor shaft 11 is capable to move to the upper side of FIG. 2. In FIG. 2, the central opening of the thrust washer 23 is slightly smaller than the outer diameter of the lower end of the rotor shaft 11. Thus, when the rotor shaft 11 moves upward, the lower end of the groove portion 11*a* is caught by the thrust washer 23, and so the rotor shaft 11 can be prevented from falling out.

When the rotor shaft 11 moves upward, the rotor hub 12 also moves upward, and following this movement, the rotor magnet 13 also moves upward. Then, the distance between the Hall element (Hall sensor) and the rotor magnet 13 increases and, if the sensitivity of the Hall sensor for detecting magnetic field is low, the magnetic field cannot be detected, which means that the operation of the position detection based on the magnetic field becomes unstable. Therefore, as illustrated in FIG. 2, the rotor shaft 11 needs to be kept in a state where the rotor shaft 11 contacts the thrust plate 24.

Focusing on the stator stack 31 and the rotor magnet 13, the rotor magnet 13 is designed to be longer than the stator stack 31 in the axial direction, and the center of the rotor magnet 13 is at a position higher than the center of the stator stack 31. It has been previously described that the rotor magnet is attracted downward due to the mutual attraction of the center positions. The mutual attractive force increases as the magnetic force of the rotor magnet 13 increases.

Therefore, by increasing the magnetic force of the rotor magnet 13, the rotor shaft 11 stably contacts to the thrust plate 24. Hereinafter, the force in the direction in which the rotor shaft 11 is positioned stably to the side of the thrust plate 24 is referred to as "thrust force". In order to obtain the thrust force by increasing the magnetic force, it is necessary that the magnetized state of the inner circumferential surface (circumferential surface) of the rotor magnet 13 is in the state of the high surface magnetic flux density in a wide range as much as possible. In other words, it is aimed to realize the range as wide as possible in the circumferential direction, in which the magnetization state is increased until the saturation magnetization state.

Figure 3:
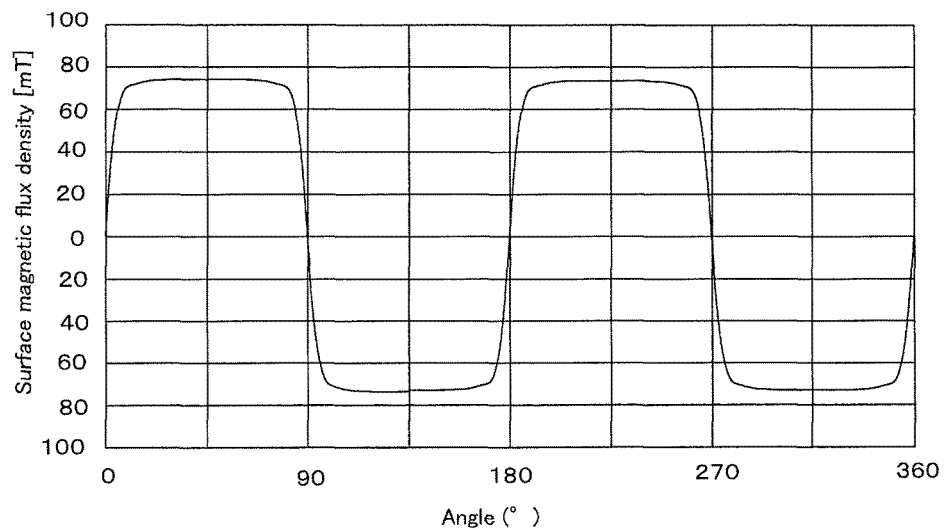
FIG. 3 is a graph of reference example 1 of the magnetization waveform to increase the thrust force.
Figure 4:
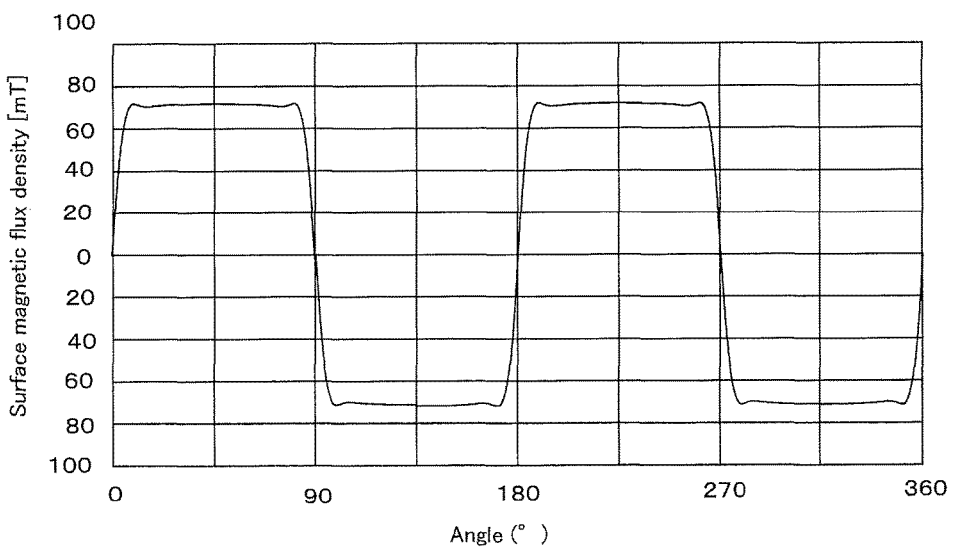
FIG. 4 is a graph of reference example 2 of the magnetization waveform to increase the thrust force.

Two reference examples of a magnetization waveform corresponding to the distribution of the surface magnetic flux density in the circumferential direction for increasing such a thrust force (first magnetization waveform) are illustrated in FIG. 3 (reference example 1) and FIG. 4 (reference example 2). In FIG. 3 and FIG. 4, a surface magnetic flux density [mT] is taken on the vertical axis, and an angle (°) of the angular position in a plane to which the cylindrical rotor magnet is developed is taken on the horizontal axis. The surface magnetic flux density of 0 [mT] appears at 90°, 180°, 270° and 360° indicating that the direction of the magnetic pole is reversed in these portions (changed from an N pole to an S pole, or from an S pole to an N pole). In other words, FIG. 3 and FIG. 4 exemplify the cases where the rotor magnet 13 has four magnetic poles in the circumferential direction. In the trapezoidal or rectangular magnetization waveforms shown in FIG. 3 and FIG. 4, the portion having a surface magnetic flux density of substantially the same level extends from the center of the magnetic pole until the vicinity of an adjacent magnetic pole. And then, the surface magnetic flux density decreases steeply toward the adjacent magnetic pole.

Figure 5:
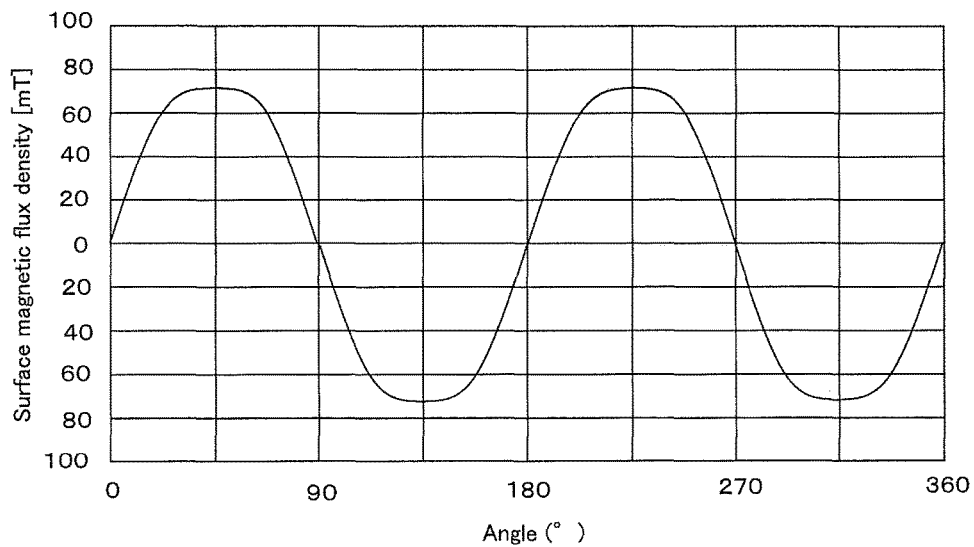
FIG. 5 is a graph of reference example 3 of the magnetization waveform to suppress the cogging torque and the torque ripple.
Figure 6:
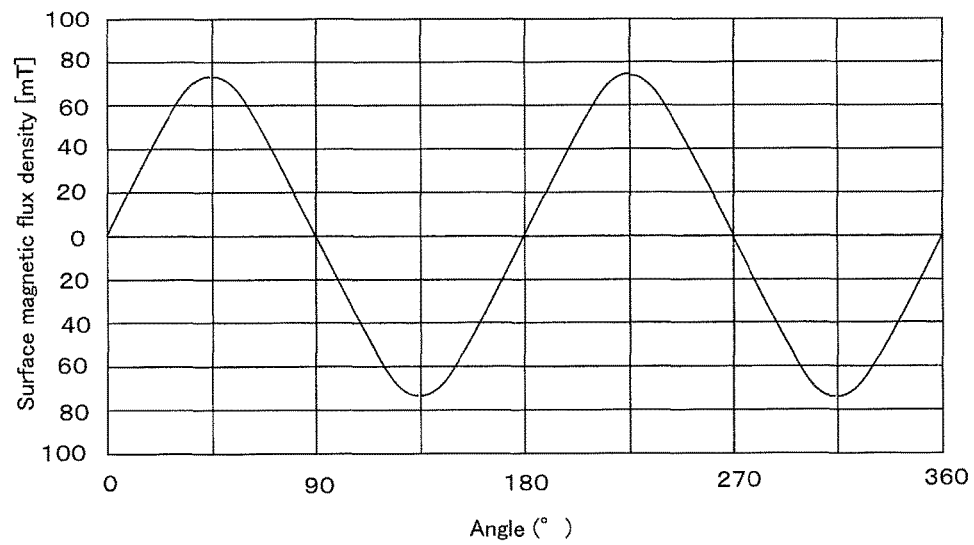
FIG. 6 is a graph of reference example 4 of the magnetization waveform to suppress the cogging torque and the torque ripple.

On the other hand, in order to suppress the cogging torque and the torque ripple, it is desirable that the magnetization waveform changes gradually. Two reference examples of such a magnetization waveform corresponding to the distribution of the surface magnetic flux density (second magnetization waveform) are illustrated in FIG. 5 (reference example 3) and FIG. 6 (reference example 4). The vertical axis and the horizontal axis of FIG. 5 and FIG. 6 are the same as those of FIG. 3 and FIG. 4. In FIG. 6, an example of surface magnetic flux density decreasing gradually from the center of a magnetic pole toward an adjacent magnetic pole is illustrated. The decreasing rate at the vicinity of the center of the magnetic pole is smaller than the decreasing rate at the vicinity of the adjacent magnetic pole. This means that the gradient of surface magnetic flux density increases as the distance from the center of the magnetic pole increases. In FIG. 5, a portion with a surface magnetic flux density of substantially the same level in comparison to the center of the magnetic pole exists in the vicinity of the center of the magnetic pole. However, the surface magnetic flux density decreases gradually as the distance from the vicinity of the center increases and the adjacent magnetic pole approaches. The difference between the magnetization waveform illustrated in FIG. 5 and those illustrated in FIG. 3 and FIG. 4 is that the portion with substantially the same surface magnetic flux density level does not extend until the vicinity of the adjacent magnetic pole. In the present description, a waveform similar to the waveform shown in FIG. 6, in which the surface magnetic flux density decreases gradually from the center of the magnetic pole toward the adjacent magnetic pole, is referred to as sinusoidal wave. In addition, a waveform similar to the waveform shown in FIG. 5 is referred to as substantially sinusoidal wave in which a portion with substantially the same surface magnetic flux density exists at the vicinity of the center of the magnetic pole and, at the position distanced from the vicinity of the center of the magnetic pole, the surface magnetic flux density decreases toward the adjacent magnetic pole more gradually than the trapezoidal or rectangular wave shown in FIG. 3 or FIG. 4. Considering the examples from FIG. 3 to FIG. 6, it can be understood that an attempt to increase the thrust force would result in a steeper change of the surface magnetic flux density in the transition of the magnetic pole. Therefore, it is difficult to simultaneously satisfy the increase of the thrust force and the gradual change of the surface magnetic flux density for suppressing the cogging torque and the torque ripple.

In addition, FIG. 3 to FIG. 6 are reference diagram that illustrates an ideal state only, and in the actual measurement, certainly there exists a case where the waveform is distorted due to the influence of a measurement error, a manufacturing error, or the like. The case where the surface magnetic flux density is not an ideally flat and high as illustrated in FIG. 3 and FIG. 4, that is, the range where the waveform seems to be distorted due to the influence of a measurement error or a manufacturing error despite of the fact that the intention is to realize a high surface magnetic flux density in a wide range, is referred to as "having a surface magnetic flux density of substantially the same level with the surface magnetic flux density at the central portion", in the present description.

Here, returning to FIG. 2 and focusing on the positional relationship between the rotor magnet 13 and the stator stack 31, the portion of the rotor magnet 13 located in a position upper than the position of the upper end surface of the stator stack 31 is considered to give small influence on the rotating state of the motor because the portion is distant from the stator stack 31. In other words, it is considered that by obtaining the thrust force using the portion of the rotor magnet 13 which gives small influence on the rotating state of the motor, the cogging torque and the torque ripple can be suppressed and the thrust force can also be increased.

Therefore, the inner circumferential surface (magnetized circumferential surface) of the rotor magnet 13 is divided into upper and lower circumferential surfaces. The upper circumferential surface 13a1 has the magnetization waveform of trapezoidal or rectangular shape as illustrated in FIG. 3 or FIG. 4 for obtaining the thrust force. On the other hand, the lower circumferential surface 13a2, which is supposed to give large influence on the rotation of the rotor, has the magnetization waveform of substantially sinusoidal shape or sinusoidal shape as illustrated in FIG. 5 or FIG. 6 for suppressing the cogging torque and the torque ripple. As a result, the improvement of the thrust force while suppressing the cogging torque and the torque ripple has been realized. In other words, the increase of thrust force and reduction of the cogging torque and the torque ripple has been realized because the surface magnetic flux density in the lower circumferential surface 13a2 decreases toward the adjacent magnetic pole with a gradient smaller than the gradient of the surface magnetic flux density in the upper circumferential surface 13a1.

Specifically, when the height position of the rotor magnet 13 which is the same to the height position of the upper end surface of the stator stack 31 illustrated in FIG.2 is taken as a "reference position A", it is preferred that the boundary between the upper circumferential surface 13a1 and the lower circumferential surface 13a2 (the position where the magnetization waveforms change) be equal to the reference position A. In order to adjust the thrust force or suppress the cogging torque and the torque ripple, the boundary may be slightly adjusted to the upward or downward direction.

If the boundary is located in the lower side of the reference position A, the magnetization waveform of the upper circumferential surface 13a1 for obtaining the thrust force appears at a position facing the stator stack 31. The boundary which is excessively lower than the reference position A influences the cogging torque and the torque ripple. However, the degree of the influence depends on a relative distance in relation to the thickness of the stator stack 31 instead of an absolute distance.

For example, if the boundary is at the position 5 mm lower than the upper end surface (position A) of the stator stack 31 when the thickness of the stator stack 31 is 10 mm, this means that one half of the stator stack 31 faces the upper circumferential surface 13a1. On the other hand, if the thickness of the stator stack 31 is 30 mm, only ⅙ of the thickness of the stator stack 31 faces the upper circumferential surface 13a1. Therefore, even if the boundary is at a position 5 mm lower than the reference position A, the latter has the smaller influence on the cogging torque and the torque ripple.

Then, if the upper circumferential surface 13a1 faces the stator stack 31 in a range of not more than ⅕ of the thickness of the stator stack 31, the influence on the cogging torque and the torque ripple is not significant. Therefore, it is preferred that the boundary between the upper circumferential surface 13a1 and the lower circumferential surface 13a2, that is, the position where the magnetization waveform of the upper circumferential surface 13a1 changes to the magnetization waveform of the lower circumferential surface 13a2 is set to be not lower than the position C which is lower than the reference position A by ⅕ of the thickness of the stator stack 31.

On the other hand, as the boundary between the upper circumferential surface 13a1 and the lower circumferential surface 13a2 distances from the reference position A and locates to the upper side, it becomes difficult to obtain the thrust force. Considering this point, for obtaining enough thrust force while suppressing cogging torque and torque ripple, it is preferable that more than one half of the portion of the rotor magnet which is in the position upper than the reference position A be formed as the upper circumferential surface 13a1.

Therefore, it is preferred that, when the distance from the reference position A to the upper end surface of the rotor magnet 13 is taken as "b", the boundary between the upper circumferential surface 13a1 and the lower circumferential surface 13a2, that is, the changing position between the magnetization waveform of the upper circumferential surface 13a1 and the magnetization waveform of the lower circumferential surface 13a2 is set to be not higher than the position B which is higher than the reference position A by ½ of the distance "b".

Summarizing the above discussion, it is desirable that, as illustrated in FIG. 2, the rotor magnet 13 has the magnetization waveform on the upper circumferential surface 13a1 and the magnetization waveform on the lower circumferential surface 13a2 changing to each other in the portion between the position C which is in a lower side from the upper end surface of the stator stack 31 by ⅕ of the thickness "e" of the stator stack 31 and the position B which is in an upper side from the upper end surface of the stator stack 31 by ½ of the distance "b" between the upper end surface of the stator stack 31 and the upper end surface of the rotor magnet 13. Further, since the lower circumferential surface 13a2 and the stator mainly play the rotational operation, in the present invention, at least a portion of the stator stack 31 is disposed to face the lower circumferential surface 13a2. Note that though the upper and the lower is reversed if the fan 1 is inverted, the expression such as the upper and the lower (height position) or the like used so far means that the direction to which the thrust force is intended to act is the lower side, and the reverse direction is the upper side, and does not mean the upper and the lower in the direction to which gravity acts.

(Measurement of Thrust Force)

Figure 7:
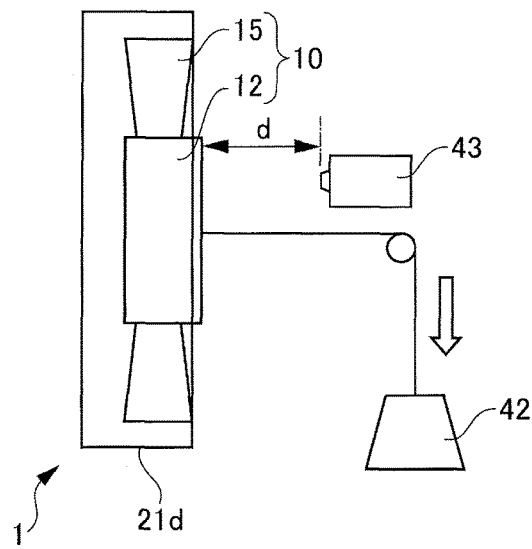
FIG. 7 is an explanatory drawing illustrating a method of a magnetic thrust force measurement.

In relation to the fan 1 in the above described embodiment, a measurement has been made to evaluate the improvement of the thrust force. Firstly, the measurement method is described with reference to FIG. 7. FIG. 7 illustrates the fan 1 where the rotor shaft 11 is set to be in a horizontal position. The left side in FIG. 7 corresponds to the lower side in FIG. 1, and the right side in FIG. 7 corresponds to the upper side in FIG. 1. The fan 1 is in a condition where the thrust washer 23 is removed, and so the rotor portion 10 can be moved to the right side in FIG. 7.

Note that, in FIG. 7, only the casing 21 and the part of rotor portion 10 corresponding to the rotor hub 12 and the blade 15 are represented. This does not intend to mean that the other members are eliminated. The fan 1 is represented in simplified manner just to indicate that the fan 1 of FIG. 1 without the thrust washer 23 is disposed in the direction illustrated in FIG. 7.

Then, as illustrated in FIG. 7, one end of a wire is fixed to the center of the rotor hub 12, and a weight 42 is suspended to the other end of wire through a pulley. Here, in a state where the weight 42 is not applied, the distance d to the rotor hub 12 is measured using a non-contact dimension measuring instrument 43 (reference distance measurement). Then, in a state where the weight 42 is applied, the distance d to the rotor hub 12 is measured again using the same non-contact dimension measuring instrument 43. Then, by taking the difference between the value of the reference distance measurement and the value of the distance measurement after applying the weigh 42t, it was determined the displacement of the rotor hub 12 when the weight 42 was applied. This displacement is equivalent to the distance that the rotor magnet 13 fixed to the rotor hub 12 separated from the Hall sensor 41. The non-contact dimension measuring instrument 43 is also commercially known as displacement sensor or the like.

Figure 8:
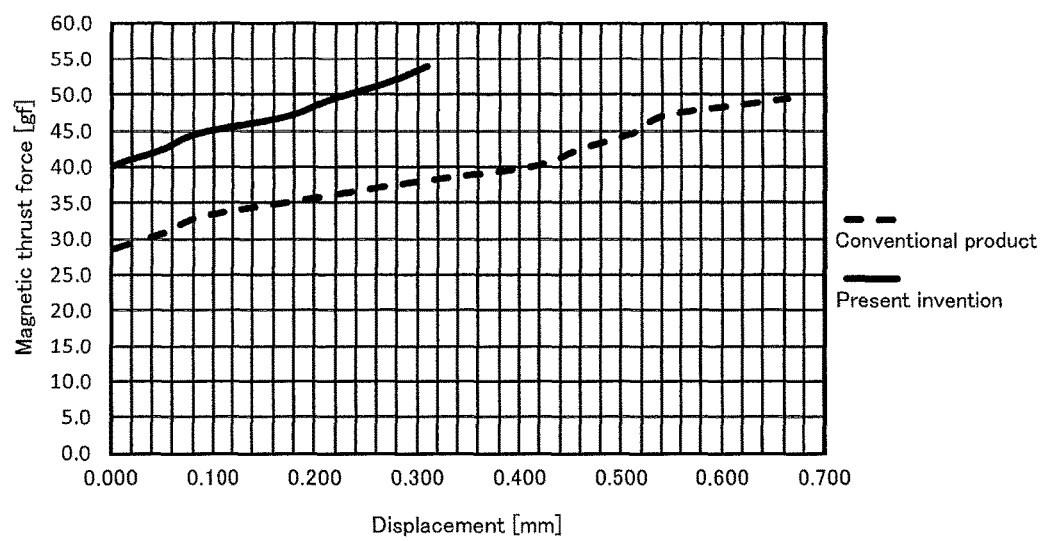
FIG. 8 is a graph illustrating measurement results of the magnetic thrust force.

The result of the thrust force (magnetic thrust force) measured as described above is illustrated in FIG. 8. In FIG. 8, the value (gf) of the applied weight (load) is taken on the vertical axis, and the displacement is taken on the horizontal axis. In FIG. 8, the conventional product corresponds to a fan in which the magnetization waveform for the lower circumferential surface 13a2 is formed t the entire length of the inner circumferential surface of the rotor magnet 13. On the other hand, the legend of present invention corresponds to the fan 1 which is an embodiment of the present invention where the inner circumferential surface of the rotor magnet 13 is divided into two portions which are the lower circumferential surface 13a2 and the upper circumferential surface 13a1. With respect to the lower circumferential surface 13a2, the same magnetization waveform as that of the conventional product is formed. In relation to the upper circumferential surface 13a1, the magnetization waveform is similar to the waveform as illustrated in FIG. 3 or FIG. 4 which intends to obtain a high surface magnetic flux density in a range as wide as possible, The boundary between the lower circumferential surface 13a2 and the upper circumferential surface 13a1 is adjusted to obtain a high thrust force in the range between the position C and the position B illustrated in FIG. 2, and to avoid the effect on the cogging torque and the torque ripple.

As illustrated in FIG. 8, the maximum load (magnetic thrust force (gf)) that the state of no displacement (displacement amount of 0 mm) of rotor hub 12 can be kept is 28.4 kgf in the conventional product, and 40.1 kgf in the embodiment of the present invention. The result confirms that the magnetic thrust force was improved by 40% [=(40.1−28.4)/28.4)×100]. In this measurement, the rotor hub 12 does not move while the holding force (magnetic thrust force) is greater than the pulling force applied by the weight, and the rotor hub 12 starts to move when the pulling force of the weight exceeds the holding force. Therefore, this measurement is also a measurement of the magnetic thrust force. Further, it was confirmed that the position detection operation of the Hall sensor was stable in the present embodiment of the invention.

In the above description, a fan as a specific application example of the brushless motor of the present invention has been described. However, as has been described sometimes in the above description, the present invention is not limited to a fan. In the case where the present invention is used as a motor itself, it is enough to remove unnecessary parts for a motor, in the configuration of the fan. Further, without departing from the concept of the present invention, various necessary configurations can be added. The configuration of the motor portion described in the above embodiment is a configuration of an outer rotor type, but it is needless to say that the present invention is also applicable to an inner rotor type.

In the case of the inner rotor type, while a rotor shaft is attached to the center portion of a rotor magnet and the rotor magnet is disposed on the center side of the motor, a stator is disposed to the outer side so as to face the outer circumferential surface of the rotor magnet. Therefore, it is enough only to magnetize the magnetization waveform on the outer circumferential surface (circumferential surface) of the rotor magnet. The range of changing the magnetization waveform and the state of the magnetization waveform to be magnetized are not in particular. In other words, it is enough to perform the magnetization so that the upper circumferential surface (the magnetization waveform illustrated in FIG. 3 and FIG. 4) and the lower circumferential surface (the magnetization waveform illustrated in FIG. 5 and FIG. 6) are formed, in relation to the upper end surface of the stator stack as a reference.

Note that it is apparent that the present invention is effective in the case where the rotor shaft can move easily in the thrust direction and the displacement becomes a matter of concern. In the exemplary embodiment, an example in which the rotor magnet became easy to move due to the structure for fitting the thrust washer has been described, but it is apparent that the present invention is not limited to such a case.

In the above description, the present invention has been described with reference to the embodiment. However, the technical scope of the present invention is not limited to the scope described in the above embodiment. It is apparent to those skilled in the art that various changes and improvements can be added to the above embodiment. It is apparent from the description of the appended claims that the embodiment added with such changes or improvements is included in the technical scope of the present invention.

REFERENCE SIGNS LIST

1 . . . fan, 5 . . . brushless motor, 10 . . . rotor portion, 11 . . . rotor shaft, 11a . . . groove portion, 12 . . . rotor hub, 13 . . . rotor magnet, 13a . . . magnetized circumferential surface (inner circumferential surface of rotor magnet), 13a1 . . . upper circumferential surface (inner circumferential surface of rotor magnet), 13a2 . . . lower circumferential surface (inner circumferential surface of rotor magnet), 14 . . . rotor yoke, 15 . . . blade, 20 . . . bearing portion, 21a . . . bearing housing, 21b . . . base portion, 21c . . . connecting portion, 21d . . . casing, 22 . . . bearing, 23 . . . thrust washer, 24 . . . thrust plate, 30 . . . stator, 31 . . . stator stack, 32 . . . insulator, 33 . . . winding, 40 . . . circuit board, 41 . . . Hall sensor, 42 . . . weight (load), 43 . . . non-contact dimension measuring instrument

The invention claimed is:

1. A brushless motor comprising:
a rotor hub;
a rotor shaft disposed at a center of the rotor hub;
a bearing housing accommodating a bearing rotatably supporting the rotor shaft;
a rotor magnet having a magnetized circumferential surface on a cylindrical inner circumferential surface, the magnetized circumferential surface comprising an upper circumferential surface magnetized with a plurality of magnetic poles and a lower circumferential surface which is magnetized with a plurality of magnetic poles in a different manner from the upper circumferential surface, and is positioned in a different position from the upper circumferential surface in the shaft direction; and
a stator having a stator stack at least partially facing the lower circumferential surface,
wherein the rotor magnet is disposed on an inner circumferential surface of the rotor hub,
wherein the stator is disposed on an outer periphery of the bearing housing,
wherein the upper circumferential surface of the rotor magnet has a surface magnetic flux density with a first magnetic flux waveform which repeats cyclically in the circumferential direction of the shaft, and
wherein the lower circumferential surface of the rotor magnet has a surface magnetic flux density with a second magnetic flux waveform which repeats cyclically in the circumferential direction of the shaft,
wherein the first magnetic flux waveform has a first periodical shape in which the peaks and troughs have a substantially flat shape in the circumferential direction of the shaft, the transitions between the peaks and troughs have a first slope with a first magnitude in the circumferential direction of the shaft, and the peaks correspond to a different magnetic pole than the troughs, and
wherein the second magnetic flux waveform has a second periodical shape in which the widths of the peaks and troughs in the circumferential direction of the shaft of the second periodical shape are smaller than the widths of the peaks and troughs of the first periodical shape in the circumferential direction of the shaft, the transitions between the peaks and troughs have a second slope with a second magnitude which is smaller than the first magnitude and the peaks correspond to a different magnetic pole than the troughs.

2. The brushless motor according to claim 1, wherein the boundary between the upper circumferential surface and the lower circumferential surface of the rotor magnet is located between a lower limit position that is set lower than the upper end surface of the stator stack by ⅕ of the thickness of the stator stack and an upper limit position that is set higher than the upper end surface of the stator stack by ½ of the distance between the upper end surface of the stator stack and the upper end surface of the rotor magnet.

3. A fan comprising:
the brushless motor according to claim 1; and
at least one blade disposed on an outer periphery of the rotor hub.

4. A fan comprising:
the brushless motor according to claim 2; and
at least one blade disposed on an outer periphery of the rotor hub.

5. The brushless motor according to claim 1,
wherein the first magnetic flux waveform and the second magnetic flux waveform in the circumferential direction of the rotor magnet have periods which are in phase with one another.

6. The brushless motor according to claim 1,
wherein the magnetic poles of the first magnetic flux waveform and the magnetic poles of the second magnetic flux waveform corresponds to each other in the circumferential direction of the rotor magnet.

7. The brushless motor according to claim 1,
wherein the first magnetic flux waveform has a substantially symmetrical form with respect to the peak of each magnetic pole; and
wherein the second magnetic flux waveform has a substantially symmetrical form with respect to the peak of each magnetic pole.

8. The brushless motor according to claim 1,
wherein the peaks and troughs of the second periodical shape have a substantially rounded shape.

* * * * *